United States Patent [19]
Padleckas et al.

[11] 3,971,183
[45] July 27, 1976

[54] INTERLOCKING CLIPS AND RAFTERS FOR ROOF PANELS

[76] Inventors: Henry Padleckas, 815 N. Oak Ave., Oak Park, Ill. 60302; Ludwig Wenzlow, 507 Longfellow Dr., Deerfield, Ill. 60015

[22] Filed: July 2, 1973

[21] Appl. No.: 375,604

[52] U.S. Cl. .................................. 52/478; 52/549
[51] Int. Cl. .............................................. E04b 1/40
[58] Field of Search .......... 52/478, 476, 462, 465, 52/466, 467, 549, 489, 495, 498, 502, 282, 281

[56] References Cited
UNITED STATES PATENTS

| | | |
|---|---|---|
| 859,635 | 7/1907 | Webster .............................. 52/549 |
| 1,144,265 | 6/1915 | Von Uffel .......................... 52/462 |
| 1,793,127 | 2/1931 | Dsius .............................. 52/498 X |
| 2,175,653 | 10/1939 | Williams ......................... 52/478 X |
| 2,711,138 | 6/1955 | Hart ................................ 52/281 X |
| 2,741,348 | 4/1956 | Zachman ........................ 52/478 X |
| 3,173,228 | 3/1965 | Roberts ........................... 52/467 X |
| 3,248,839 | 5/1966 | Roberts et al. .................. 52/495 X |
| 3,616,588 | 11/1971 | Hansson .............................. 52/495 |

Primary Examiner—Price C. Faw, Jr.
Attorney, Agent, or Firm—John J. Kowalik

[57] ABSTRACT

A combination rafter and cap-like clip structure with wedging interlocking lugs which are adapted to press pad-like flanges on the clips against roof panels against supports on the rafter.

7 Claims, 13 Drawing Figures

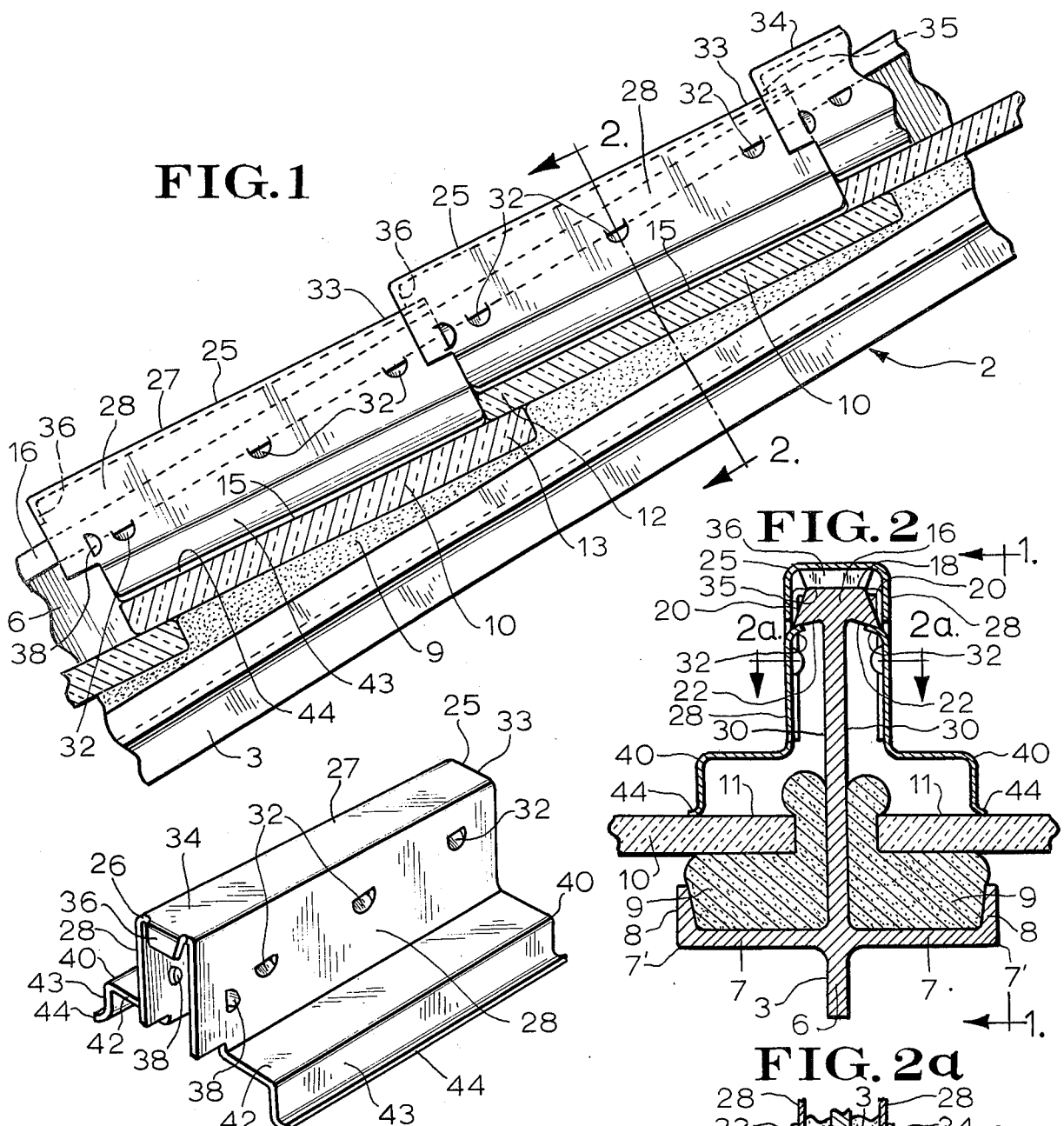
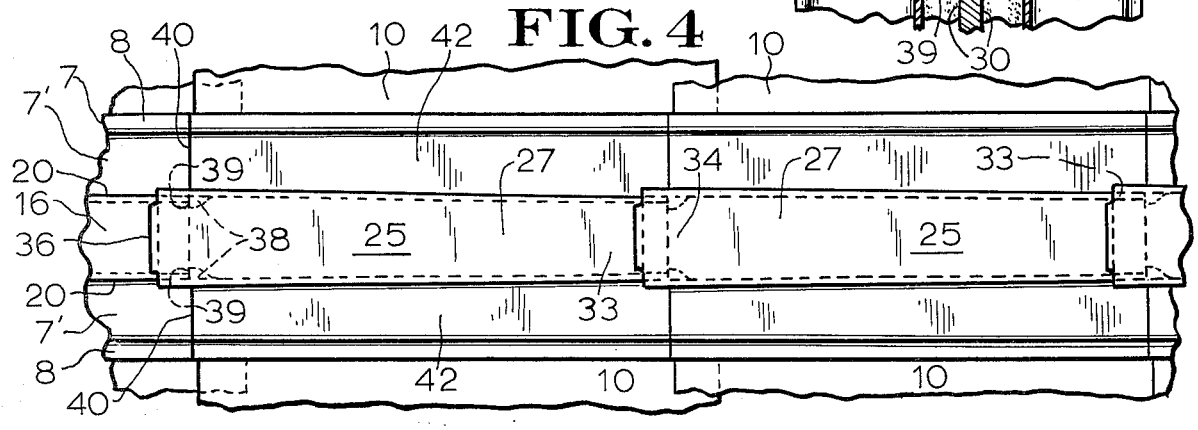

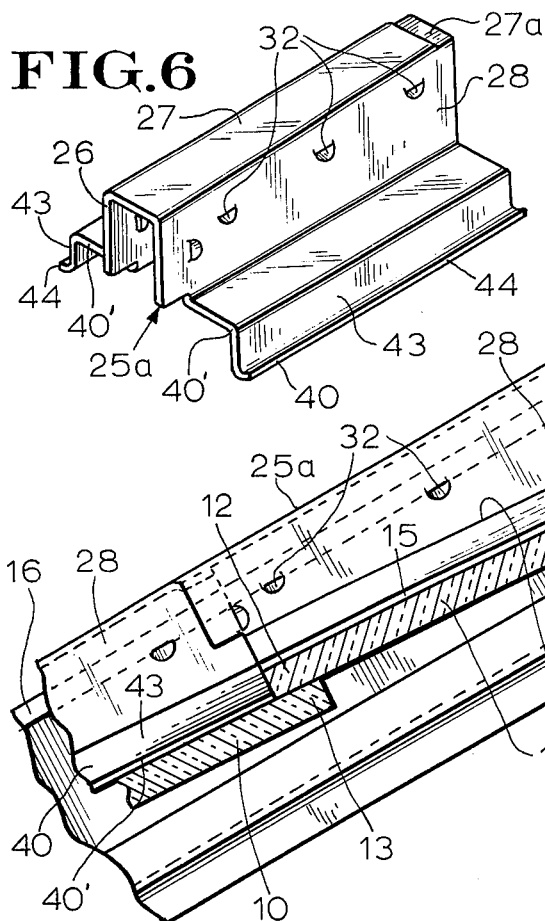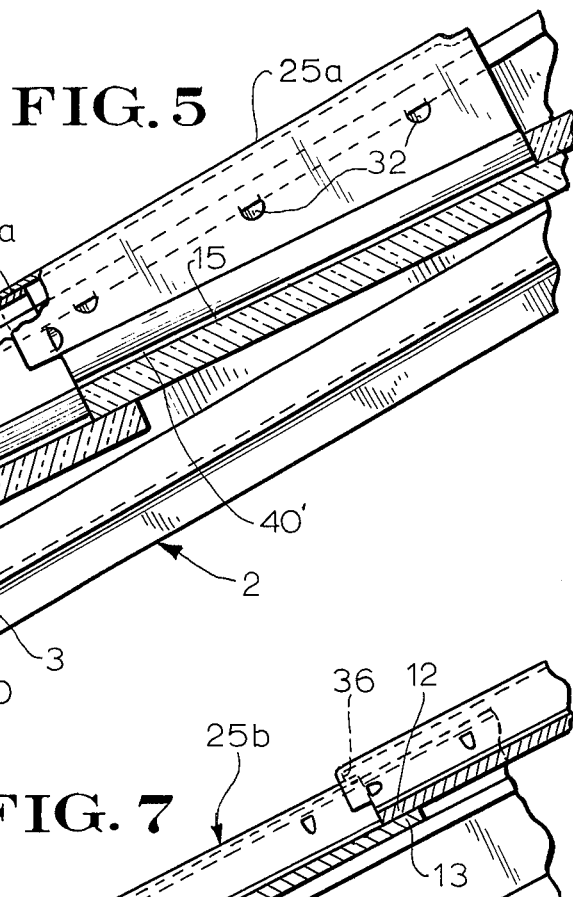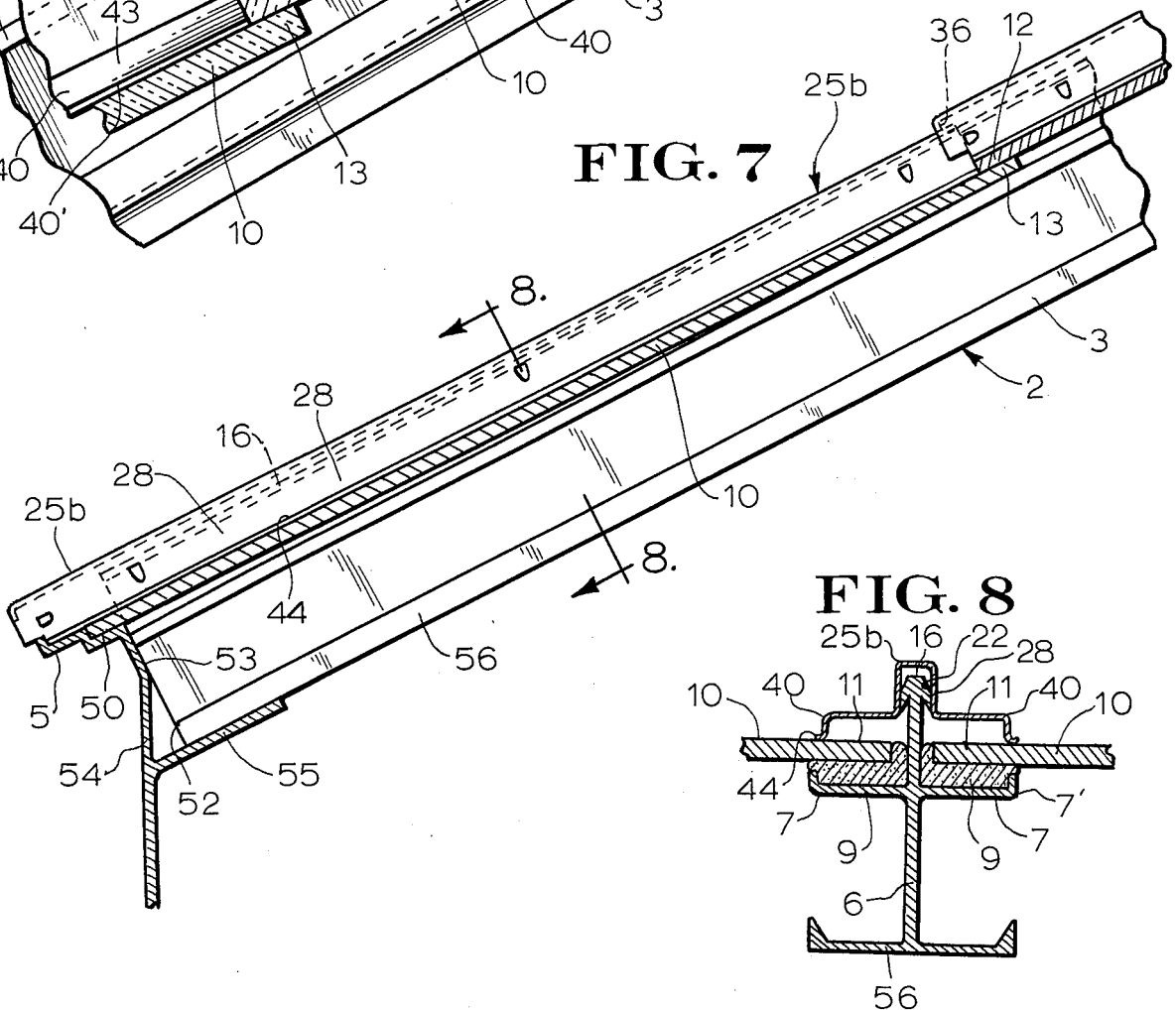

INTERLOCKING CLIPS AND RAFTERS FOR ROOF PANELS

DISCUSSION OF THE PRIOR ART

In glazing the roofs of greenhouses, the practice heretofore required the glazer to position the hold-down clips in the rafter and then screw in self tapping screws into the rafter. Overtightening the rigid clip caused the panel to crack and particularly if the clip should be positioned to impose a high pressure load on on edge of the glass panel. In addition, the handling of small, self-tapping screws is time consuming, tedious and imposes excessive labor costs, and also requires stocking inventories.

The present type of fasteners are difficult to remove when the screws become frozen either due to rusting or galvanic action when stainless steels screws are threaded into aluminum rafters. The rigid clips are not self-adjusting and therefore unless the panels are set high in the glazing sealant or mastic and tightly pressed down, which adds to the possibility of cracking, the panels will be loose.

Furthermore, such looseness cannot be particularly tolerated if the roof is to be waterproof. Adjustability, if any, in the prior art structures was very limited and assembly primitive.

SUMMARY OF THE INVENTION

This invention is directed to a novel self-locking clip and rafter assembly which is of simple construction and which is easy to assemble for new construction and quick to remove to permit fast replacement of broken panes.

An important object is to provide novel clip and rafter members which are adapted for wedging engagement with each other to releasably hold the glass roof panels in assembly with the rafters.

A further object is to provide a novel rafter having a vertical rigidifying rib and a pair of flanking laterally extending troughs for holding the sealing putty therein, upon which the edges of the glass roof panels are imbricately arranged, the rib having wedge-shaped projections along its upper edge beneath which prongs on the clip are adapted to engage.

The invention comprehends providing hold-down clips of channel or U-shape in cross-section, comprising a pair of side walls embracing the vertical rafter rib and a top wall overlying the shoulders on the upper edge of the rib, the lower ends of the walls being formed with resilient laterally outwardly extending press-down feet or flanges which are adapted to rest upon the tops of the adjacent glass panels, the side walls having inwardly directed tabs or prongs which slide beneath the shoulders and wedge the clip between the shoulders and the glass panels, which are inclined toward the shoulders.

The invention comprehends a rafter and clip structure in which the clips are of resilient metal construction preferably stainless steel and the rafter preferably formed of soft metal or aluminum, provides downwardly facing wedge faces on its vertical rib, the clip having inwardly directed projections or tangs which engage under the wedge faces and are locked against the respective glass panels simply by sliding the clip downwardly along the respective sloping panels whereby the resilient flanges forming the feet are sprung upwardly and thus resiliently holding the panels embedded in the mastic in the rafter troughs therebeneath.

A further object of the invention is to provide novel clips which are each constructed at its lower end to fit over the upper end of the next lower clip to provide a continuous cover for the rafter rib and also the adjacent ends of the glass panels from the eves to the ridge of the roof.

In one embodiment of the invention, the wedge tabs are arranged parallel with the top wall of the clip and the press-down flange pads converge with the plane of the top wall. In another embodiment, the top wall and flange pads are parallel, but the wedge tabs are arranged along a line converging with the plane of the press-down flange pads.

The invention also provides clips which have inwardly directed stop tabs on the side walls of each clip for engagement with the edges of the side walls of the next lower clip to limit telescoping movement thereover—thus maintaining the clips in proper relation to each other.

These and other objects and advantages inherent in and encompassed by the invention will become more readily apparent from the specifications and the drawings, wherein:

FIG. 1 is a sectional view of a roof structure incorporating one embodiment of the invention taken substantially on line 1—1 of FIG. 2;

FIG. 2 is a cross-sectional view taken substantially on line 2—2 of FIG. 1;

FIG. 2A is a horizontal sectional view taken substantially on the line 2a—2a of FIG. 2;

FIG. 3 is a perspective view of the novel hold-down clip;

FIG. 4 is a fragmentary top plan view of the structure shown in FIG. 1;

FIGS. 5 and 6 illustrate another embodiment of the invention;

Figures 9, 10, 11, 12:
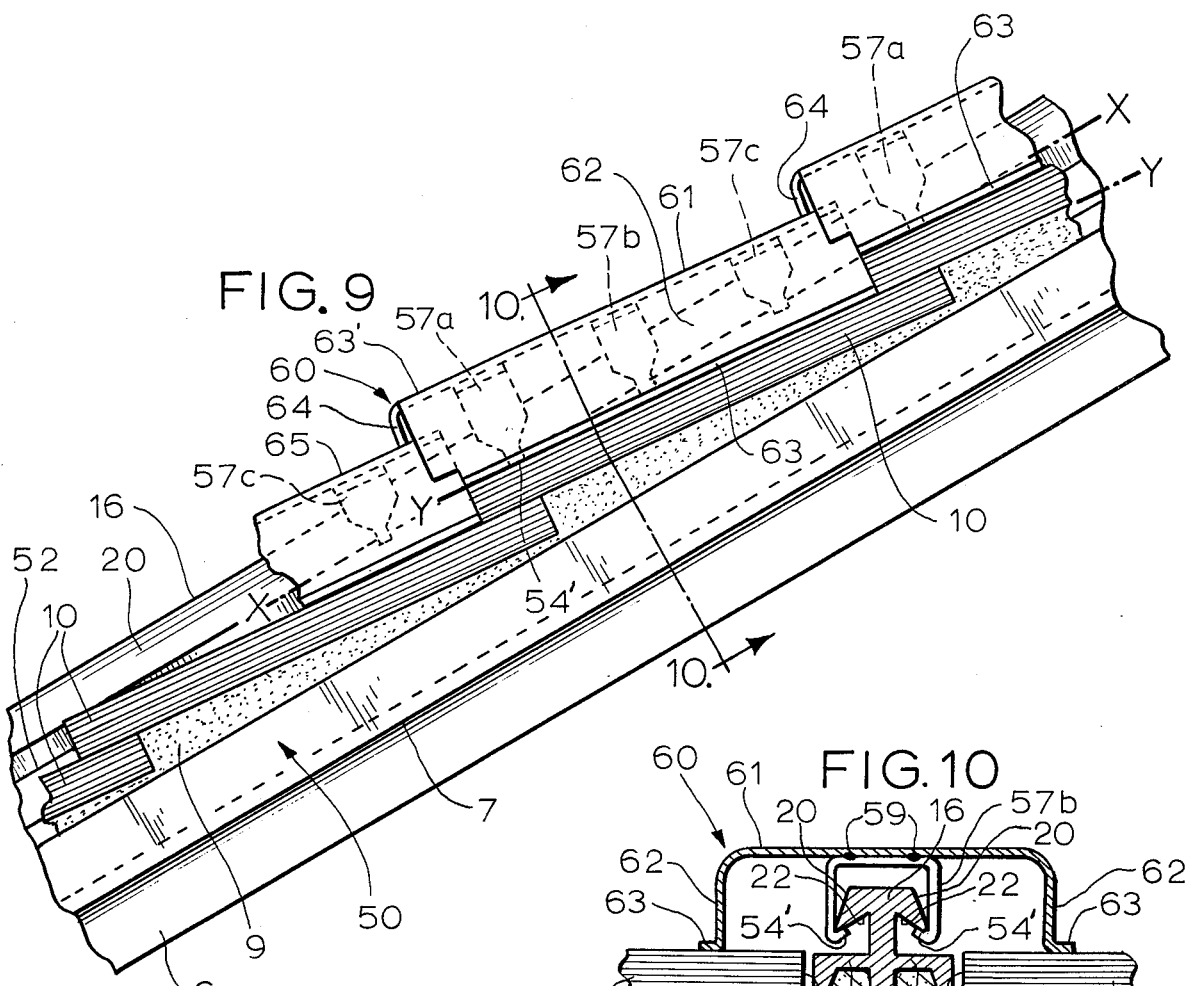

FIG. 5 being a view comparable to FIG. 1; and

FIG. 6 being a perspective view of the modified clip;

FIGS. 7 and 8 show a further embodiment;

FIG. 7 being a view comparable to FIG. 5; and

FIG. 8 being a cross-sectional view taken substantially on line 8—8 of FIG. 7.

FIGS. 9–12 illustrate another embodiment;

FIG. 9 being a longitudinal section similar to FIG. 1;

FIG. 10 being a cross-section on line 10—10 of FIG. 9;

FIG. 11 being a perspective view of the clip, and

FIG. 12 being a perspective view of one of the stirrups.

DESCRIPTION OF FIGS. 1–4

Referring to the drawings, there is shown a portion of a roof structure generally designated 2 which comprises a series of rafters 3 (only one being shown) of a gable type roof wherein the rafters extend between the ridge pole (not shown) and the wall plate 5 shown in FIG. 7.

The rafter is generally cruciform in cross-section and comprises a vertical web 6 which intermediate its ends is provided with laterally extending troughs 7', each, having a bottom wall 7, and an upright flange 8 for containing a sealant 9 such as glazing putty or mastic.

As best seen in FIG. 2, the glass roof panels 10,10 are laid at opposite edges 11 upon the sealant and embedded therein, it being understood that the panels are of a width of the spacing of the rafters. The panels are imbricatably arranged as best seen in FIG. 1, and are laid shingle fashion from the bottom to the top of the roof, each panel (except for the lowermost) having its lower edge portion 12 resting upon the upper edge portion 13 of the panel therebelow. In view of this arrangement of glass panels, which are rectangular and flat, the upper side 15 of each panel slopes upwardly in the direction toward the lower end of the roof and converges toward a laterally projecting lip or locking flange or ledge 16 located along the upper edge of the vertical web or wall 6. The flange or shoulder 16 has a flat upper edge 18 and downwardly diverging side edges 20,20 and is in the form of a trapezoid in cross-section, the base bottom of which has laterally inwardly sloping wedge surfaces 22,22 which converge toward the center web 6.

In the embodiment of FIGS. 1–4, the panels are held down by a plurality of identical hold-down clips 25,25 which are also imbricately arranged, as best seen in FIG. 1, and snapped onto the securing ledge as hereinafter described. Each clip has a U-shaped or channel body portion 26 having a transverse top wall 27 and a pair of depending side walls 28,28. The top wall overlays the top edge 18 and the side walls 28,28, flanking the sides 30,30 of the vertical web 6. The side walls are each provided with a series of inwardly extending half-moon shaped tangs, prongs, or projections 32,32 arranged along a line converging toward the upper end 33 of the clip (described in mounted position) with the upper wall 27 and the prongs are angled upwardly as best seen in FIG. 2 and project beneath the respective wedge surfaces 22 in wedging engagement therewith not only laterally of the rafter but also longitudinally thereof.

In order to wedge the clip lengthwise of the rafter, it is pushed down, the prongs riding under the locking ledge and the clip having its lower end 34 which is wider between the side walls than its upper end (the side walls converging toward the upper end) telescoped over the upper end of the next lower positioned clip. In view of the arrangement of the locking prongs, the clip is tilted upwardly toward its lower end, so that the top wall 27 of each clip projects over the upper end 33 of the top wall of the next lower clip, which is engaged at 35 by an abutment tab 36 which depends from the lower end 34 of the top wall of the clip thereabove. This tab is of such length as to hold the locking prongs 32 under stress, which act as cantilevered leaf springs, it being understood that the clip is made of metal having a resilient character such as stainless steel. Each clip has a pair of transversely aligned inwardly directed stops 38,38 on its side walls adjacent to its lower end, said stops engageable with the upper edges 39,39 of the upper end of the next lower clips.

The clip is provided with a pair of laterally extending hold-down feet 40,40 which are vertically flexible and have horizontal webs 42,42 extending outwardly from the lower edges of the side walls, and each web 42 is formed with a downwardly extending web 43, which has a lower outturned panel-engaging flange or pad 44. The flange 44 and the top preferably of the clip are prferalb parallel.

It will be realized that the arrangement of the wedge locking prongs and the position thereof on a line which converges with the plane of the panel-engaging pads; together the inclination of the glass panels effects a wedging action of the clips between the rafter and panels with attendant upward deflection of the hold-down feet.

It will be apparent that the clips are capable of being merely snapped one over the other in the position shown in FIGS. 1 and 4.

DESCRIPTION OF FIGURES 5 and 6

The structure shown in these figures is essentially the same as in the previous embodiment and therefore like parts are identified by corresponding reference numbers. The clips identified 25a differ from the previous embodiment in the arrangement of the tangs 32,32 which are positioned in rows parallel with the top wall 27 of the clip. The top wall 27 is offset downwardly at its upper edge portion at 27a and fits under the lower edge portion of the next succeeding upper clip. Also the feet 40′,40′ are angled and converge toward the top wall in the direction toward the lower end of the clip which provides the wedging action against the glass panel as the clip is slid downwardly along the rafter.

DESCRIPTION OF FIGS. 7 AND 8

This embodiment is similar to the previous except that the tangs 32,32 of clip 25b are arranged in a row parallel with the top 27 and the feet pads 44. The overlap structure is the same as in FIG. 1 and the clips are longer.

In each embodiment the lowermost clip fits into a stepped upper plate and the lowermost panel fits into a groove 50 in the plate. The lower end 52 of each rafter fits against an inclined portion 53 of a stud 54 formed integral with the plate and seats upon a ledge 55 also formed with the stud. In this embodiment a second trough structure 56 is formed below the upper trough 7′ and may serve as a rain gutter in case of leaks. Structure 56 also rigidifies the rafter.

DESCRIPTION OF FIGS. 9–12.

The structure shown in this modification has counterparts similar to those of the previous embodiments and such parts are identified by the same reference numerals.

The panels 10, which in this embodiment are shown as glass, may also be plastic or other material. This is also contemplated for all of the other embodiments as well. The panels are imbricately arranged and at adjacent edges 11 are seated upon the putty or other sealant 9 which is located in the troughs 7 which are disposed at opposite sides of the vertical web 6 of the rafter 50′.

The rafter 50′ comprises adjacent to its upper edge a pair of laterally extending stop rails 52″,52″ which serve as guides for the inner edges 53′,53′ of the panels.

The locking shoulder or ledge 16 has underedge faces 22 which are engaged by hooks 54′,54′ snapped thereunder, the hooks being formed on the reduced end portions 55,55 of a pair of vertical legs 56,56 of each of the stirrups 57a, 57b, and 57c. Each stirrup has a cross-member bight portion 58 interconnecting its respective legs. Each portion 58 is welded or bonded at 59 to the underside of a U-shaped or channel securing clip or bracket 60 which comprises a top wall 61 and upright side walls 62,62 which are provided with lower edge, outwardly-extending, panel-engaging flanges 63. The lower end 63′ of each clip has a depending tab 64 which is adapted to bear against the upper side 65 of the top wall of the next lower clip. It will be understood that the stirrups 57a, 57b, and 57c are progressively smaller or shorter from the lower end 63' to the upper end 66 of the clip whereby the level of the hooks thereon are in a plane $x$—$x$ converging toward the lower end of the clip with respect to the plane $y$—$y$ of the bottom flanges 63 of the clips whereby in view of the convergence of the planes of the panels with respecto to the locking ' dge, movement of the clips downwardly into imbricate relation with each other coincidentally effects a tightening or wedging action of the clips between the rafter ledge and the respective panels. The clips are preferably of resilient, spring like metal and the stirrups may be of the same metal. However, it will be understood that in lieu of metal all of the foregoing embodiments of FIGS. 1–12, the parts may be made of any suitable flexible plastic material such as nylon, polyethelyne, polypropylene, "Delrin" or any other suitable plastic material.

In the embodiment of FIGS. 9–12 the caps or clips are applied simply by snapping the stirrups onto the ledge which is trapezoidal in cross-section and provides the side wedge spreader faces 20,20. To remove the clip is pressed downwardly to release the hooks and is slid laterally to move one of the hooks from under the respective ledge; then the clip is released and the hook moves past the ledge catch; then the clip is moved in the opposite direction laterally while being pushed down on the side toward which the clip is being moved so as thus to release the other hook from under the ledge. The clip is then lifted up.

Several embodiments of the invention have been disclosed to illustrate several preferred modifications of the invention. However, it should be understood that the foregoing disclosure is only by way of illustration, which is not to be regarded as limiting the invention, but which is to be considered in the scope of the appended claims.

We claim:

1. A hold-down clip and rafter combination for securing roof panels;

a rafter having catch means extending longitudinally thereof, means for supporting said panels against said rafter beneath said catch means, and clips having means for engagement with said catch means and slidable thereon lengthwise of said rafter into wedging securing engagement between said catch means and associated panels therebeneath;

and said rafter comprising a longitudinal vertical web and said catch means disposed along the upper edge of the web, and each clip having resilient portions overlying respective panels and flexible transversely thereof;

and each clip having a body portion sleeved over the web and having on said body portion inwardly extending projections constituting latch means;

and said latch means located along a line converging with the planes of the catch means.

2. The invention according to claim 1 and said catch means comprising laterally extending ribs on the upper edge of said web and having underedge surfaces converging toward said web.

3. The invention according to claim 2 and each clip being generally channel shaped in cross-section, including a pair of side walls flanking the web of the rafter and having lower end portions constituting resilient feet projecting laterally from the side walls and adapted to overlie respective panels.

4. The invention according to claim 3 and each clip having projections extending inwardly from respective side walls and engaging under respective ribs.

5. A hold-down clip and rafter combination for securing roof panels comprising: a rafter having catch means extending longitudinally thereof, means for supporting said panels against said rafter beneath said catch means, and clips having means for engagement with said catch means and slidable thereon lengthwise of said rafter into wedging securing engagement between said catch means and associated panels therebeneath, and said rafter comprising a longitudinal vertical web and said catch means disposed along the upper edge of the web, and each clip having resilient portions overlying respective panels and flexible transversely thereof, and said catch means comprising laterally extending ribs on the upper edge of said web and having underedge surfaces converging toward said web, and each clip being generally channel shaped in cross section, including a pair of side walls flanking the web of the rafter and having lower end portions constituting resilient feet projecting laterally from the side walls and adapted to overlie respective panels, and each clip having projections extending inwardly from respective side walls and engaging under respective ribs, and the projections disposed in converging relation to the planes of said lower end portions whereby said clips upon sliding movement along said rafter effect a wedging action between the feet through said projections with said ribs thereby effecting a tight securement of the panels.

6. The invention according to claim 5 and said rafter having laterally extending trough-like ledges for supporting sealing compound thereon for supporting imbricately arranged glass panels thereon and being pressed therewith by said feet.

7. The invention according to claim 1 and said clips being channel shaped and sleeved over the rafter and each having an end portion for telescoping interfit with the adjacent clips, and means on each clip for limiting telescoping movement thereof into the other.

* * * * *